United States Patent [19]
Horiuchi et al.

[11] Patent Number: 5,172,389
[45] Date of Patent: Dec. 15, 1992

[54] GAS LASER APPARATUS

[75] Inventors: Naoya Horiuchi, Kawasaki; Hitoshi Hongu, Kobe, both of Japan

[73] Assignee: Matsushita Electric Industrial Co., Ltd., Japan

[21] Appl. No.: 473,524

[22] Filed: Feb. 1, 1990

[30] Foreign Application Priority Data

Feb. 7, 1989 [JP] Japan .................................. 1-28189

[51] Int. Cl.⁵ .............................................. H01S 3/097
[52] U.S. Cl. ........................................... 372/87; 372/61
[58] Field of Search ................ 372/87, 88, 69, 61, 372/55, 81

[56] References Cited

U.S. PATENT DOCUMENTS

| | | | |
|---|---|---|---|
| 3,427,567 | 2/1969 | Bridges et al. | 372/87 |
| 4,589,114 | 5/1986 | Sutter, Jr. | 372/87 |
| 4,618,961 | 10/1986 | Sutter, Jr. | 372/87 |
| 4,689,798 | 8/1987 | Fox et al. | 372/87 |
| 4,730,333 | 3/1988 | Butenoth | 372/87 |
| 4,764,932 | 8/1988 | Peterson et al. | 372/62 |
| 4,800,567 | 1/1989 | LaRobe | 372/87 |
| 4,821,279 | 4/1989 | Bell | 372/62 |

FOREIGN PATENT DOCUMENTS

| | | |
|---|---|---|
| 56-138976 | 10/1981 | Japan . |
| 60-3170 | 1/1985 | Japan . |
| 62-183580 | 8/1987 | Japan . |
| 63-24686 | 2/1988 | Japan . |
| 63-60577 | 3/1988 | Japan . |
| 63-98163 | 4/1988 | Japan . |
| 1-66983 | 3/1989 | Japan . |

Primary Examiner—Léon Scott, Jr.
Attorney, Agent, or Firm—Lowe, Price, LeBlanc, Becker & Shur

[57] ABSTRACT

A gas laser apparatus includes an insulating material layer covering the outside of a pair of metal electrodes disposed on the outer peripheral surface of a dielectric discharge tube. The insulating material layer thus provided electrically separates the metal electrodes and prevents a dielectric tube which would otherwise occur through an air gap between adjacent portions of the metal electrodes when a high-frequency voltage is applied across the metal electrodes.

3 Claims, 1 Drawing Sheet

GAS LASER APPARATUS

BACKGROUND OF THE INVENTION

The present invention relates to a gas laser apparatus of the type in which a gas contained in a dielectric discharge tube is excited by a high-frequency oscillator.

The high-frequency exciting system has recently occupied the attention of laser researchers and manufacturers as a preferable exciting system for gas laser apparatus. This is because the high-frequency exciting system possesses a great advantage over a direct-current exciting system by virtue of the features itemized below.

(1) Electrodes can be provided on the outside of a discharge tube. Since the electrodes do not directly contact a gas contained in the discharge tube, the gas is substantially free from deterioration. This arrangement of the electrodes is particularly suitable for use with carbon dioxide lasers in which carbon dioxide having a high chemical reactivity is employed.

(2) The discharge takes place longitudinally and the distance between the opposed electrodes can be narrowed so that the operating voltage is about one-tenth as large as the operating voltage of the direct-current exciting system. With this lower operating voltage, a solid-state power source is available.

(3) An improved distribution and uniformity of discharge provides a stable power output and an excellent laser mode.

(4) A high energy conversion efficiency due to a reactive ballast.

Owing to the foregoing advantageous features, a gas laser apparatus employing the high-frequency exciting system is smaller in size and higher in efficiency and quality than the gas laser apparatus utilizing the direct-current exciting system. The high-frequency excited gas laser apparatus find use in high precision, carbon dioxide laser cutting machines.

An example of such high-frequency excited gas laser apparatus is disclosed in Japanese Patent Laid-open Publication No. 60-3170.

The disclosed high-frequency excited laser apparatus includes, as reillustrated here in FIG. 3 of the accompanying drawings, a hollow cylindrical discharge tube 1 formed of a dielectric material such as $SiO_2$ or $Al_2O_3$, and a pair of metal electrodes 2, 2' extending helically around an the outer peripheral surface of the dielectric discharge tube 1 in parallel spaced relation to one another. The electrodes 2, 2' are generally formed by a printing process or a metal deposition process into a thin film layer. The metal electrodes 2, 2' are connected via a matching circuit 4 to a high-frequency power source 5. The high-frequency power source 5 applies a high-frequency voltage across the metal electrodes 2, 2' to excite a gas contained in the dielectric discharge tube 1 whereby a discharge of the gas takes place in a discharge space within the discharge tube 1.

The discharge condition thus produced by the conventional gas laser apparatus is likely to vary with the shape and arrangement of the electrodes and sometimes occurs only locally. As a result, the output power of the gas laser apparatus is lowered and the power output stability of the gas laser apparatus is considerably deteriorated too. In the worst case, the discharge terminates soon.

Prior attempts proposed to overcome the foregoing drawbacks include an improved arrangement of the electrodes in which the spacing between the electrodes is reduced or narrowed in such a manner as to enlarge a discharge region until a non-discharge region substantially eliminated. Such arrangement of the electrodes is not satisfactory because narrowing of the inter-electrode spacing has a limit, or a dielectric breakdown occurs through an air gap between adjacent portions of the electrodes when a high electric voltage in the order of several kV is applied across the closely spaced electrodes.

SUMMARY OF THE INVENTION

With the foregoing drawbacks of the prior art in view, it is an object of the present invention to provide a gas laser apparatus including a pair of electrodes which are disposed in closely spaced relation but are free from dielectric breakdown even when a great high-frequency voltage is applied thereacross.

In brief, a gas laser apparatus according to the present invention includes an insulating material layer covering the respective outside surfaces of a pair of metal electrodes disposed on an outer peripheral surface of a dielectric discharge tube.

The insulating material layer thus provided electrically separates the metal electrodes and provides an increased impedance in an air gap between the metal electrodes. As a result, the dielectric tube is protected from dielectric breakdown which would otherwise occur through the air gap between the adjacent electrodes when a high-frequency voltage is applied across the closely spaced electrodes.

Furthermore, the outside of the electrode surfaces is concealed and hence not exposed to atmosphere. Accordingly, the electrode surfaces are perfectly protected from dirt and dust which tend to lower the surface resistance and finally cause a dielectric breakdown. The concealed electrodes are free from oxidization and have a long serve life.

More particularly, according to the present invention, there is provided a gas laser apparatus which comprises a discharge tube formed of a dielectric material and containing a gas; a pair of electrodes disposed on an outer peripheral surface of the discharge tube in confronting relation to one another; a layer of insulating material covering the entire outside surfaces of the respective electrodes and portions of an outer peripheral surface of the discharge tube extending between the electrodes; and means for applying a high-frequency voltage across the pair of electrodes for producing a discharge of the gas contained in the discharge tube.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The present invention will be described below in greater detail with reference to an embodiment shown in FIGS. 1 and 2 of the accompanying drawings.

Figure 1:
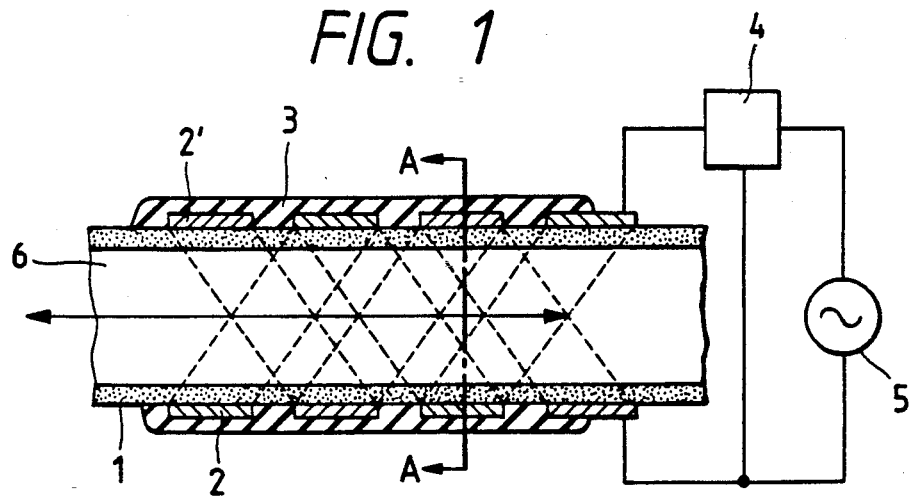
FIG. 1 is a diagrammatical view of a gas laser apparatus having a discharge tube shown in cross section.
Figure 2:
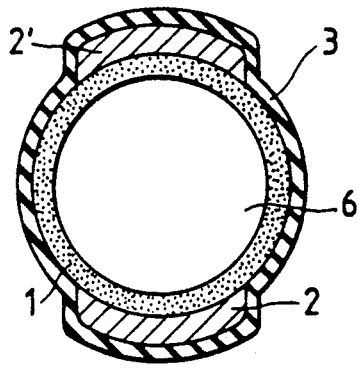
FIG. 2 is a cross-sectional view taken along line A—A of FIG. 1.
Figure 3:
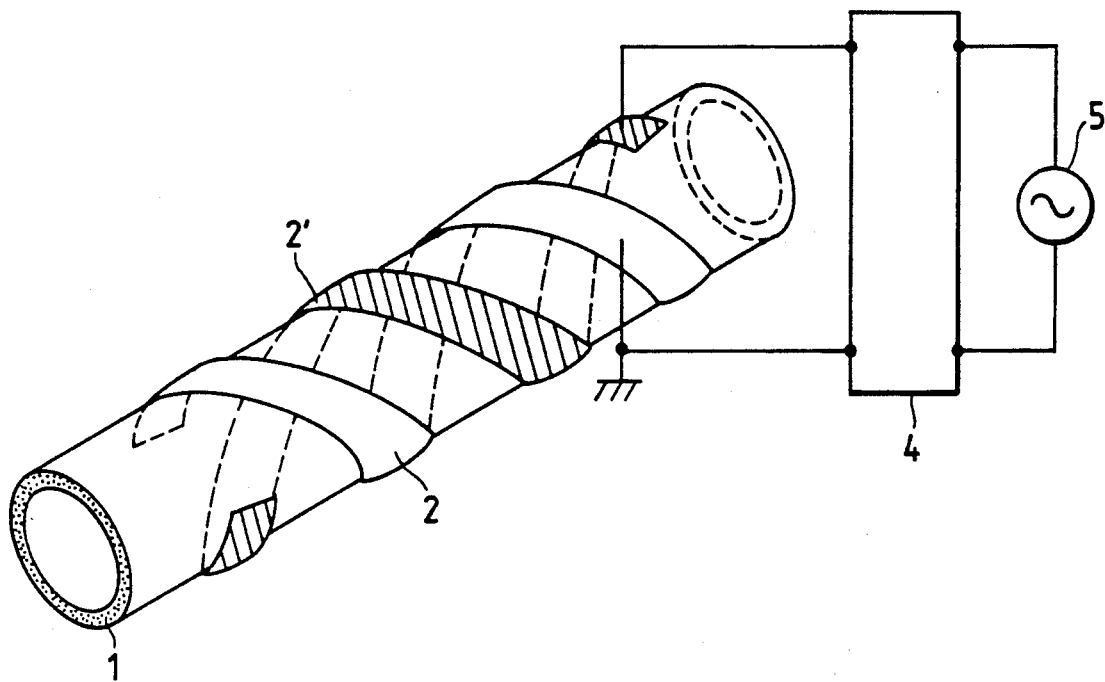
FIG. 3 is a diagrammatical view of a conventional laser apparatus having a discharge tube shown in perspective.

FIG. 1 diagrammatically shows a gas laser apparatus of the co-axial type including a hollow cylindrical discharge tube 1 formed of a dielectric material such as a quartz and containing a gas, and a pair of metal electrodes 2, 2' formed on an outer peripheral surface of the dielectric discharge tube 1 by means of a suitable process such as a printing or a metal spraying. In the illustrated embodiment, the metal electrodes 2, 2' extend helically around the dielectric discharge tube 1 in parallel spaced relation to one another. Any other arrangement of the metal electrodes is available provided that the two electrodes 2, 2' are disposed in confrontation to one another across an internal space 6 in the dielectric discharge tube 1, as shown in FIG. 2.

The metal electrodes 2, 2' disposed on the outside of the dielectric discharge tube 1 have different polarities and they are covered with a layer 3 of an insulating material. The insulating material layer 3 covers outside surfaces of the respective metal electrodes 2, 2', as well as these portions of an outer peripheral surface of the dielectric discharge tube 1 which extend between the electrodes 2, 2'.

The insulating material layer 3 may be composed of a thin ceramic layer coated over the outer periphery of the dielectric discharge tube 1 and the metal electrodes 2, 2' disposed around the dielectric discharge tube 1. Portions of the insulating material layer 3 extending over the metal electrodes 2, 2' have a uniform thickness. The metal electrodes 2, 2' are covered with the insulating material layer 3 throughout their outside surfaces except for respective portions connected to a high-frequency power source 5.

The high-frequency power source 5 generates a high-frequency voltage and applies the same across the metal electrodes 2, 2' via a matching circuit 4. The gas contained in the dielectric discharge tube 1 is excited by the thus applied high-frequency voltage whereby a discharge of the gas occurs and a laser beam running in a longitudinal direction of the dielectric discharge tube is obtained. The metal electrodes 2, 2' are spaced as close as possible so as to produce a uniform discharge of gas. Since the closely spaced metal electrodes 2, 2' are electrically separated by the insulating material layer 3, a dielectric breakdown through an air gap between adjacent portions of the metal electrodes 2, 2' does not take place even when a high-frequency voltage is applied across the metal electrodes 2, 2'. Consequently, a stable discharge condition can be obtained. Owing to the closely arranged metal electrodes 2, 2', there is provided a wide discharge region distributed uniformly within the dielectric discharge tube 1. This wide discharge region insures the formation of a stable glow discharge. The gas laser apparatus of the foregoing construction is highly efficient and has a high output power stability. The metal electrodes 2, 2' coated with the insulating material layer 3 are free from surface deterioration and hence have a long service life.

Obviously various minor changes and modifications of the present invention are possible in the light of the above teaching. It is therefore to be understood that within the scope of the appended climes the invention may be practiced otherwise than as specifically described.

What is claimed is:
1. A gas laser apparatus comprising:
   (a) a discharge tube formed of a dielectric material and containing a gas;
   (b) a pair of electrodes disposed on an outer peripheral surface of said discharge tube in confronting relation to one another;
   (c) a layer of insulating material covering the entire outside surfaces of the respective electrodes and portions of an outer peripheral surface of said discharge tube extending between said electrodes; and
   (d) means for applying a high-frequency voltage across said pair of electrodes for producing a discharge of said gas contained in said discharge tube.
2. A gas laser apparatus according to claim 1, wherein said electrodes extend helically around said discharge tube in parallel spaced relation to one another.
3. A gas laser apparatus according to claim 1, wherein said insulating material layer comprises a film of a ceramic.

* * * * *